US008527795B2

(12) United States Patent
Howard et al.

(10) Patent No.: US 8,527,795 B2
(45) Date of Patent: Sep. 3, 2013

(54) CHANGING PROCESSOR PERFORMANCE FROM A THROTTLED STATE DURING A POWER SUPPLY FAILURE

(75) Inventors: Derek Lee Howard, Rochester, MN (US); Martha Ann Broyles, Austin, TX (US); Peter Adam Wendling, Poughkeepsie, NY (US); Raymond J Harrington, Staatsburg, NY (US); Todd Jon Rosedahl, Zumbrota, MN (US)

(73) Assignee: International Business Machines Corporation, Armonk, NY (US)

( * ) Notice: Subject to any disclaimer, the term of this patent is extended or adjusted under 35 U.S.C. 154(b) by 1343 days.

(21) Appl. No.: 12/241,134

(22) Filed: Sep. 30, 2008

(65) Prior Publication Data

US 2010/0083007 A1    Apr. 1, 2010

(51) Int. Cl.
*G06F 1/00* (2006.01)
*G06F 1/26* (2006.01)
*G06F 1/32* (2006.01)

(52) U.S. Cl.
USPC .......................... 713/322; 713/320; 713/340

(58) Field of Classification Search
USPC .......................... 713/322, 320, 340
See application file for complete search history.

(56) References Cited

U.S. PATENT DOCUMENTS

| 4,590,553 | A | * | 5/1986 | Noda | 713/320 |
| 5,745,375 | A | * | 4/1998 | Reinhardt et al. | 700/286 |
| 5,825,674 | A | * | 10/1998 | Jackson | 713/321 |
| 6,823,516 | B1 | | 11/2004 | Cooper | |
| 6,931,559 | B2 | * | 8/2005 | Burns et al. | 713/340 |
| 7,017,058 | B2 | | 3/2006 | Chen | |
| 7,017,060 | B2 | | 3/2006 | Therien et al. | |
| 7,076,672 | B2 | | 7/2006 | Naveh et al. | |
| 7,124,321 | B2 | | 10/2006 | Garnett et al. | |
| 7,571,342 | B2 | * | 8/2009 | Tanaka et al. | 713/600 |
| 2005/0172157 | A1 | * | 8/2005 | Artman et al. | 713/300 |
| 2005/0251795 | A1 | * | 11/2005 | Fernandez et al. | 717/151 |
| 2006/0143486 | A1 | | 6/2006 | Lamdan et al. | |
| 2007/0016815 | A1 | | 1/2007 | Cooper et al. | |
| 2007/0050647 | A1 | | 3/2007 | Conroy et al. | |
| 2007/0220288 | A1 | | 9/2007 | Huang et al. | |
| 2007/0250218 | A1 | * | 10/2007 | Culley | 700/295 |
| 2007/0283172 | A1 | | 12/2007 | Douriet et al. | |
| 2008/0052543 | A1 | | 2/2008 | Sokorac | |

* cited by examiner

*Primary Examiner* — Thomas Lee
*Assistant Examiner* — Terrell Johnson
(74) *Attorney, Agent, or Firm* — Garg Law Firm, PLLC; Rakesh Garg; Libby Z. Toub

(57) ABSTRACT

A method, system, and computer usable program product for improving processor performance during power supply failure are provided in the illustrative embodiments. A throttled condition of a processor is detected in a data processing system. A voltage of the electrical power being provided to the processor is reduced. The processor is un-throttled. Additionally, a frequency of electrical power being provided to the processor may also be reduced. A determination is made whether a condition that caused the throttling has been corrected. In response to the condition having been corrected, the frequency is returned to normal frequency and the voltage is returned to normal voltage. The reducing the frequency operation and reducing the voltage operation may each be performed by distinct components communicating over a data network external to the data processing system.

28 Claims, 5 Drawing Sheets

CHANGING PROCESSOR PERFORMANCE FROM A THROTTLED STATE DURING A POWER SUPPLY FAILURE

BACKGROUND OF THE INVENTION

1. Field of the Invention

The present invention relates generally to an improved data processing system, and in particular, to a computer implemented method for managing system performance in a data processing environment. Still more particularly, the present invention relates to a computer implemented method, system, and computer usable program code for improving processor performance during power supply failure.

2. Description of the Related Art

A data processing system may experience a loss of electrical power during the data processing system's operation. For example, a power supply unit supplying electrical power to the data processing system may fail to supply electrical power to the data processing system. A power supply unit is a component of a data processing system that transforms, converts, or otherwise conditions electrical power received from the power grid and provides the transformed, converted, or conditioned electrical power to one or more other components in the data processing system.

In many data processing systems, more than one power supply units supply power to the various components of the data processing system. Multiple power supply units are often used to provide redundancy so that a catastrophic failure and complete shutdown of the data processing system can be avoided. Sometimes, several power supply units are used to enable the operation of the data processing system under partial power conditions. More than one power supply units are common in data processing systems, and especially in data processing systems with several processors.

When a power supply unit fails to provide electrical power as expected, the data processing system is said to be experiencing a power supply failure. In some data processing systems, the system must continue operating even when a power supply fails. To continue operation under reduced power due to a power supply failure condition, some data processing systems shut down or reduce power supply to certain components within the data processing system.

Generally, a processor in a data processing system is one of the largest consumers of electrical power. In case of a power supply failure, many data processing systems employ techniques to reduce the power consumption of one or more processors in those data processing systems.

One common technique to reduce a processor's power consumption is called processor throttling. Processor throttling is the process of inserting no-operation instructions in the processor's instruction queue. A no-operation instruction is an instruction that instructs the processor to not perform any operation. Processor throttling using no-operation instructions effectively idles the processor for a significant number of processor cycles, in effect dropping the power consumption of the processor.

The data processing system's overall performance deteriorates significantly when a processor is throttled. In many cases, processor throttling can cause the performance of a data processing system to drop by as much as eighty-five percent of pre-throttling performance. Thus, while the data processing system may continue to operate under a power supply failure condition, the drop in performance from processor throttling can limit productive use of the data processing system.

SUMMARY OF THE INVENTION

The illustrative embodiments provide a method, system, and computer usable program product for improving processor performance during power supply failure. A throttled condition of a processor is detected in a data processing system. A voltage of the electrical power being provided to the processor is reduced. The processor is un-throttled.

Additionally, a frequency of electrical power being provided to the processor may also be reduced. A determination is made whether a condition that caused the throttling has been corrected. In response to the condition having been corrected, the frequency is returned to normal frequency and the voltage is returned to normal voltage. The reducing the frequency operation and reducing the voltage operation may each be performed by distinct components communicating over a data network external to the data processing system.

The frequency and the voltage may each be reduced to respective levels suitable for the processor. The un-throttling may be performed by removing a no-operation instruction from the processor's instruction queue. Reducing the frequency, reducing the voltage, and un-throttling the processor may result in an increase in processor performance compared to a level of performance of the throttled processor.

The processor may be multiple processors. The detecting, reducing, and un-throttling operations may be applied to a subset of processors from the multiple processors. The processor may be throttled in response to an over-current condition in the data processing system, an over-temperature condition in the processor, or a combination thereof.

BRIEF DESCRIPTION OF THE DRAWINGS

The novel features believed characteristic of the invention are set forth in the appended claims. The invention itself; however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The illustrative embodiments recognize that processor throttling degrades the performance of the data processing system for the duration of the power supply failure. The illustrative embodiments further recognize that a failed power supply unit may not be repaired or replaced for many days or many hours. Consequently, the data processing system that has its processor(s) throttled can be left operating at undesirably low performance for an unacceptably long period of time.

To address these and other problems related to data processing system performance during power supply failure, the illustrative embodiments provide a method, system, and computer usable program product for improving processor performance during power supply failure. The overall performance of data processing system is related to the performance of the processor. Improving the processor performance by implementing the illustrative embodiments while a power supply unit remains inoperative may improve the performance of the one or more throttled processors as well as the overall performance of the data processing system.

The illustrative embodiments describe ways in which changing the voltage of and the frequency of the processor's electrical power can allow elimination or reduction in the use of the no-operation instructions. By altering the voltage, the frequency, or both in accordance with the illustrative embodiment, a processor can be un-throttled and all or a significant portion of the lost processor performance can be regained.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

The illustrative embodiments are described in some instances using particular data processing environments only as an example for the clarity of the description. The illustrative embodiments may be used in conjunction with other comparable or similarly purposed architectures for using virtualized real memory and managing virtual machines.

Figure 1:
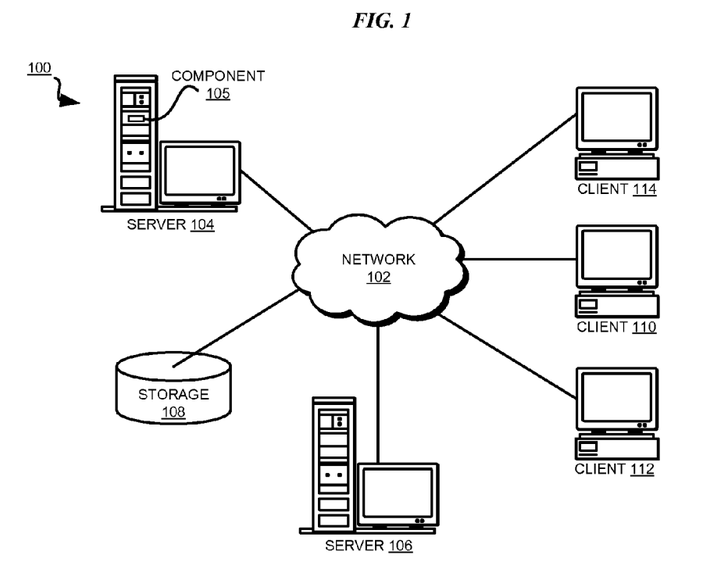
FIG. 1 depicts a pictorial representation of a network of data processing systems in which illustrative embodiments may be implemented.
Figure 2:
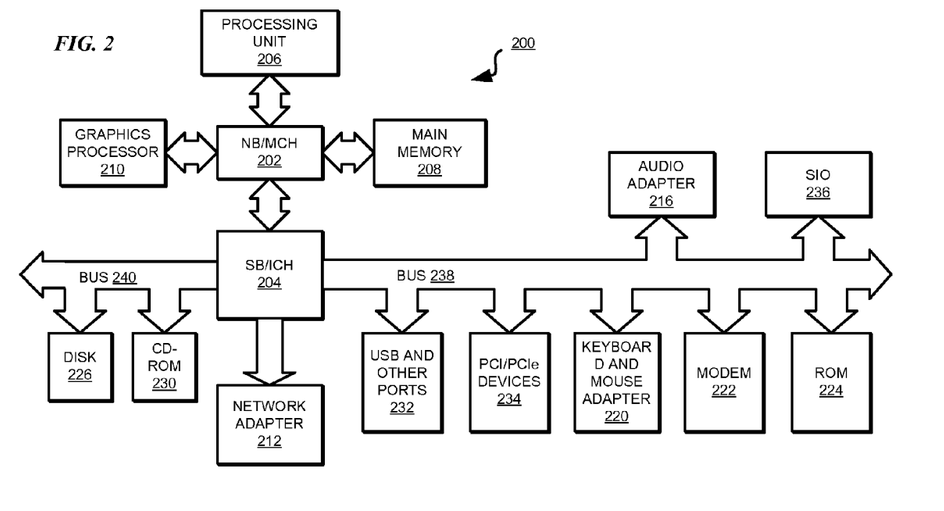
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108.

Software applications may execute on any computer in data processing environment 100. In the depicted example, server 104 includes component 105, which may be one or more software applications, hardware components, firmware, or any combination thereof. Component 105 may alter the voltage, frequency, or both to the processor of server 104 or another data processing system in data processing environment 100. Other data processing systems, such as server 106, client 110, client 112, and client 114 may also use components similar to component 105 for similar purposes.

In addition, clients 110, 112, and 114 couple to network 102. Servers 104 and 106, storage units 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
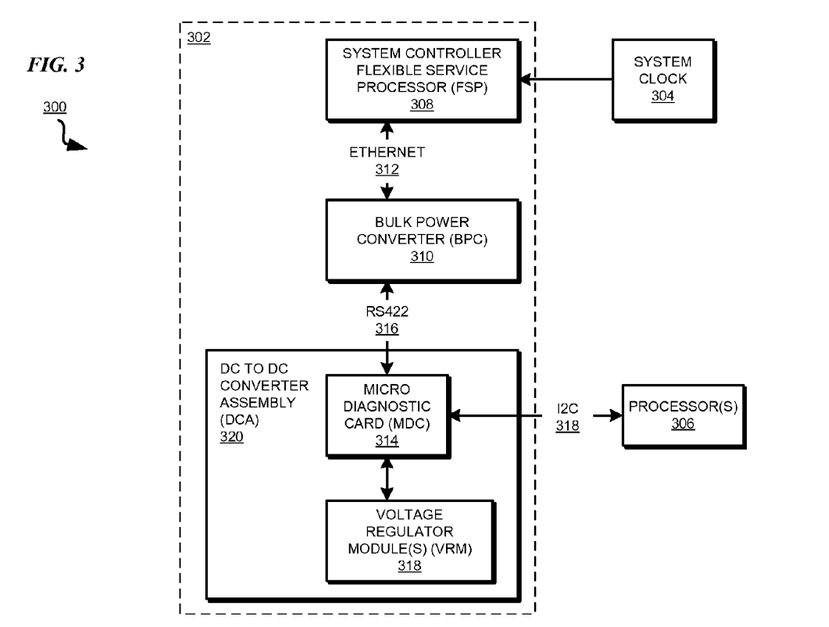
FIG. 3 depicts a block diagram of an example configuration of components for regulating voltage and frequency to a processor in accordance with an illustrative embodiment.

With reference to FIG. 3, this figure depicts a block diagram of an example configuration of components for regulating voltage and frequency to a processor in accordance with an illustrative embodiment. Configuration 300 may include component 302, which may be implemented as component 105 in FIG. 1. Further, component 302 may not be a single physical component in a particular implementation. Component 302 may be a logical or physical coupling of other sub-components. Component 302 may comprise one or more physical, logical, or software sub-components to implement the functions describe herein. Furthermore, the sub-components may be interconnected via one or more data buses within a data processing system or be distributed across a data processing environment and reachable over a data network. Such alternate configurations of component 302 are contemplated within the scope of the illustrative embodiments.

Component 302 may interact with other components of the data processing system or the data processing environment where component 302 may be implemented. For example, the data processing system may include system clock 304 that may provide a clock pulse for the data processing system's operation. The data processing system or another data processing system connected over a data network may include processor 306 whose electrical power the illustrative embodiments may modify. Processor 306 may be one or more processors. Processor 306 may be the processor that may be throttled in case of a power supply failure.

In one embodiment as depicted in this figures, component 308 may control and alter the frequency of the electrical power being provided to processor 306. In some implementations, component 308 is also known as system controller flexible service processor (FSP). Flexible service processor 308 may be a component that may be located within or separate from the data processing system whose processor 306 may have been throttled.

Flexible service processor 308 communicates with component 310 over Ethernet 312. Component 310 may be a component associated with a data processing system to detect, manage, and communicate power related conditions that may be present in the data processing system. In some implementations, component 310 is also known as bulk power converter (BPC). In the embodiment depicted in this figure, bulk power converter 310 is shown to communicate with flexible service processor 308 over Ethernet 312. However, alternate implementations may facilitate data communication between bulk power converter 310 and flexible service processor 308 in alternate ways without departing from the scope of the illustrative embodiments.

Bulk power converter 310 communicates with component 314 over data bus 316 in the data processing system. Component 314 may be a component that communicates with processor 306 and exerts control over processor 306, including throttling processor 306. In some implementations, component 314 is also known as micro diagnostic card (MDC). Data bus 316 is also known as the RS422 bus in some implementations.

Micro diagnostic card 314 may communicate with processor 306 over data bus 318. Bus 318 is also known as the I2C bus in some implementations.

Micro diagnostic card 314 may communicate with component 320. Component 320 may regulate the voltage of the electrical power being supplied to processor 306 in response to such communications from micro diagnostic card 314. In some implementations, component 320 is also known as the voltage regulator module (VRM). A data processing system may include one or more voltage regulator modules. Micro diagnostic card 314 and voltage regulator module 320 may be associated with assembly 322 in the data processing system. In some implementations, assembly 322 is also known as the DC to DC converter assembly (DCA).

Figure 4:
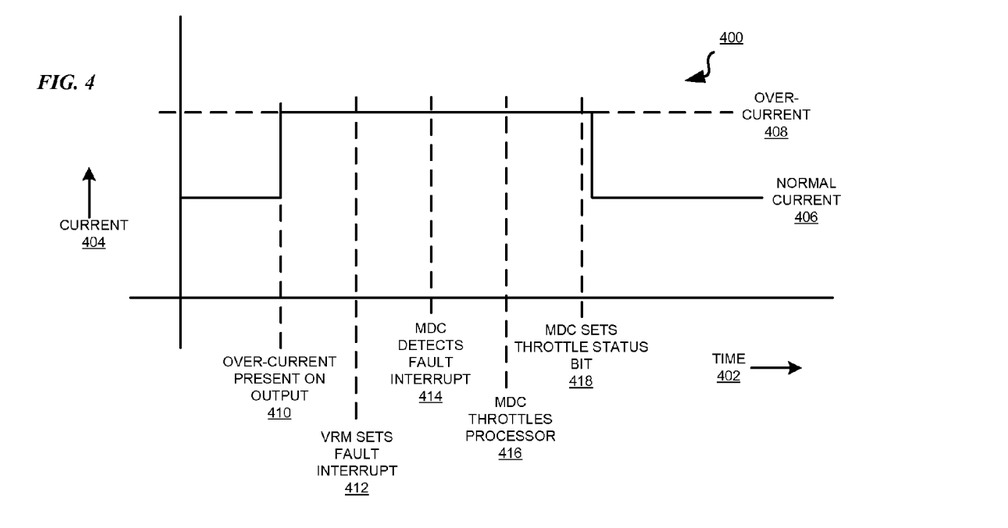
FIG. 4 depicts a graph of events during a power supply failure that the illustrative embodiments may augment and influence.

With reference to FIG. 4, this figure depicts a graph of events during a power supply failure that the illustrative embodiments may augment and influence. Graph 400 may be plotted from events occurring in configuration 300 in FIG. 3.

Graph 400 depicts time 402 on the X-axis and current 404 on the Y-axis. Current 404 is the total current draw of the data processing system at any given time on graph 400. Generally, when a power supply fails, the total current draw of the system increases from normal current value 406 to over-current value 408.

Normal current value is the value or range of values of the current at which the data processing system is designed to operate. Over-current value is the value or range of values that exceed the normal current value.

In the order of events in an example embodiment, over-current may be present on an output of any remaining power supply at time 410. Within some time from detecting the over-current, the voltage regulator module, such as voltage regulator module 318 in FIG. 3, may send a signal of fault, generally by setting or raising a fault interrupt, at time 412.

After the fault interrupt is set, a micro diagnostic card, such as micro diagnostic card 314 in FIG. 3, detects the fault interrupt at time 414. Upon detecting the fault interrupt, the micro diagnostic card throttles the processor, such as processor 306 in FIG. 3, at time 416. The micro diagnostic card also informs other components of the throttled state of the processor, such as by setting a throttle status bit, at time 418.

As described above, the processor is throttled by inserting several no-operation instructions in the processor's instruction queue. As a result, the processor begins to spend idle cycles, consuming far less power than the processor would consume while executing another instruction. Consequently, the current value drops from over-current value 408 to normal current value 406 or thereabout.

When eventually the failed power supply unit is replaced, presently used processes un-throttle the processor. The illustrative embodiments recognize that present processes to manage power supply failures do not take any further action to manage the power supply failure during such continuing failure.

Figure 5:
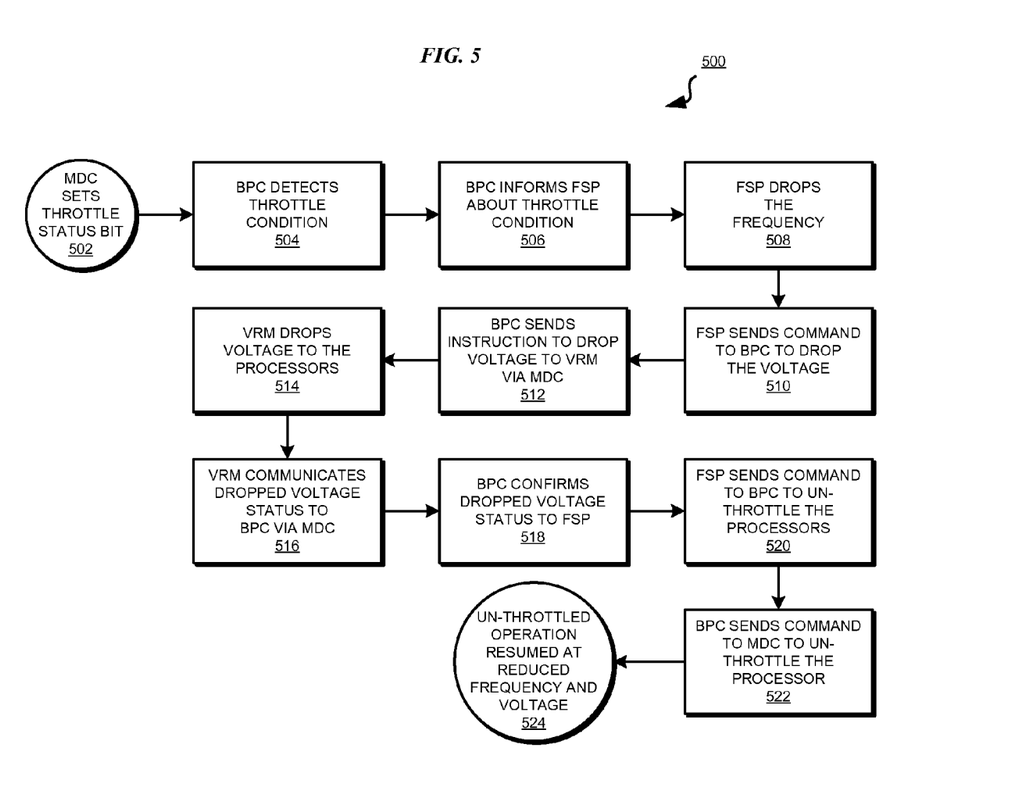
FIG. 5 depicts a flowchart of a process of regaining a throttled processor's performance in accordance with an illustrative embodiment.

With reference to FIG. 5, this figure depicts a flowchart of a process of regaining a throttled processor's performance in accordance with an illustrative embodiment. Process 500 may be implemented using configuration 300 in FIG. 3. The micro diagnostic card, the bulk power converter, the flexible service processor, and the voltage regulator module components references in process 500 correspond to those respective components as depicted in FIG. 3. Of course, these components are specifically used only as an example for illustration purposes and equivalent components in other configurations may be similarly used without departing from the illustrative embodiments.

Process 500 may follow after the events described in graph 400 in FIG. 4 have occurred. Process 500 begins when the micro diagnostic card sets the throttle status bit (state 502). The bulk power converter detects the throttle condition, for example, by examining the throttle status bit, (step 504). The bulk power converter informs the flexible service processor about the throttle condition, such as by communicating over the data network (step 506).

In response to learning about the throttled status of the processor, the flexible service processor drops or reduces the frequency of the electrical power being supplied to the processor (step 508). The flexible service processor also sends a command to the bulk power converter to drop or reduce the voltage (step 510).

Normal voltage value is the value or range of values of the voltage at which the data processing system is designed to operate. The normal voltage is also called normal operating voltage. Reduced voltage value is the value or range of values that are below the normal voltage value. Normal frequency value is the value or range of values of the frequency of the current at which the data processing system is designed to operate. The normal frequency is also called normal operating frequency. Reduced frequency value is the value or range of values that are below the normal frequency value.

In response to the command, the bulk power converter sends an instruction to the voltage regulator module via the micro diagnostic card to reduce the voltage (step 512). The voltage regulator module reduces the voltage of the electrical power being supplied to the processor (step 514).

The voltage regulator module confirms the dropped voltage status to the bulk power converter via the micro diagnostic card (step 516). The bulk power converter confirms the dropped voltage status to the flexible service processor (step 518).

Thus, the frequency and the voltage are both reduced following the processor throttling. The amount of voltage reduction and frequency reduction are implementation dependent. For example, different processors are designed to operate within different voltage and frequency ranges, and a specific amount of drop in either voltage or frequency may have to be computed based on the processor specifications and other conditions. The illustrative embodiments describe the process of reducing the voltage and the frequency generally, and contemplate that the reduction amounts may substantially among implementations within the scope of the illustrative embodiments.

Returning to process 500, once the flexible service processor learns of the reduction in voltage and frequency, the flexible service processor sends a command to the bulk power converter to un-throttle the processor (step 520). The bulk power converter sends a command to the micro diagnostic card to un-throttle the processor (step 522). The micro diagnostic card un-throttles the processor by removing the no-operation instructions from the processor's instruction queue. Un-throttled operation resumes at reduced frequency and reduced voltage (state 524).

Thus, the illustrative embodiments regain a substantial portion of the processor performance that was lost due to processor throttling. In this manner, the illustrative embodiments allow the data processing system to operate at improved overall performance during a power supply failure. The performance achieved by using the illustrative embodiments is generally higher than the performance of the data processing system when the processors are left in a throttled state.

Figure 6:
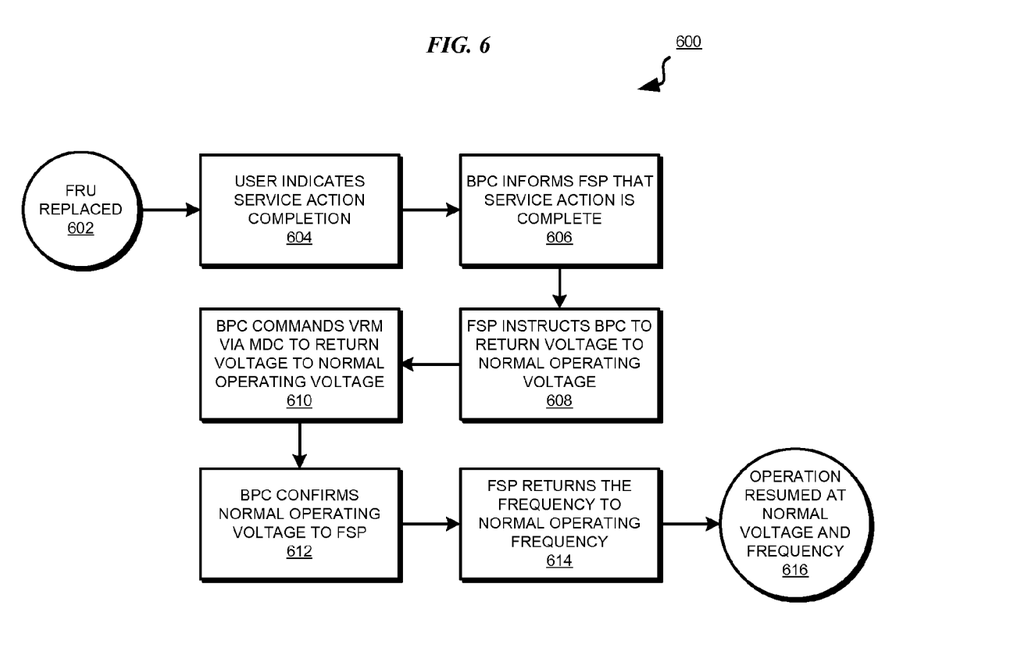
FIG. 6 depicts a flowchart of a process of returning un-throttled reduced voltage and frequency operation to un-throttled normal voltage and frequency operation in accordance with an illustrative embodiment.

With reference to FIG. 6, this figure depicts a flowchart of a process of returning un-throttled reduced voltage and frequency operation to un-throttled normal voltage and frequency operation in accordance with an illustrative embodiment. Process 600 may be implemented using configuration 300 in FIG. 3. Process 600 may follow process 500 in FIG. 5. The micro diagnostic card, the bulk power converter, the flexible service processor, and the voltage regulator module components references in process 500 correspond to those respective components as depicted in FIG. 3.

A field replacement unit (FRU) is a component of a data processing system that can be replaced where the data processing system may be located, to with, "in the field". A power supply unit can be a field replacement unit. A failed power supply unit can be replaced in some instances by shipping a replacement power supply unit to the location of the data processing system, such as a customer site, and having a user, such as a technician, replace the failed power supply unit as a field replacement unit.

Process 600 begins when the field replacement unit has been replaced as described above (state 602). When the user replaces the failed power supply unit with the field replacement unit the user indicates in the data processing system that the service action is complete (step 604). A service action is a request for service, such as a request for replacing a failed power supply unit. The user may indicate the completion of the service action in any manner suitable for a given implementation without departing from the scope of the illustrative embodiments.

The bulk power converter detects the indication of service action completion and informs the flexible service processor that the service action is complete (step 606). The flexible service processor instructs the bulk power converter to return the voltage to the normal voltage level (step 608).

The bulk power converter commands the voltage regulator module to return the voltage to the normal voltage from the reduced voltage as in FIG. 5, (step 610). The bulk power converter sends this command to the voltage regulator module via the micro diagnostic card. The bulk power converter receives confirmation to return to normal voltage and sends the confirmation to the flexible service processor (step 612).

The flexible service processor returns the frequency of the electrical power to the normal frequency from the reduced frequency as in FIG. 5, (step 614). The operation of the data processing system and the processor therein returns to un-throttled normal voltage and frequency operation in accordance with the illustrative embodiments.

While the illustrative embodiments are described with respect to throttling and un-throttling a single processor, any number of processors may be un-throttled using the illustrative embodiments in a similar manner. The relative timing and sequence of the various steps may change based on specific implementations without departing from the scope of the illustrative embodiments.

Figure 7:
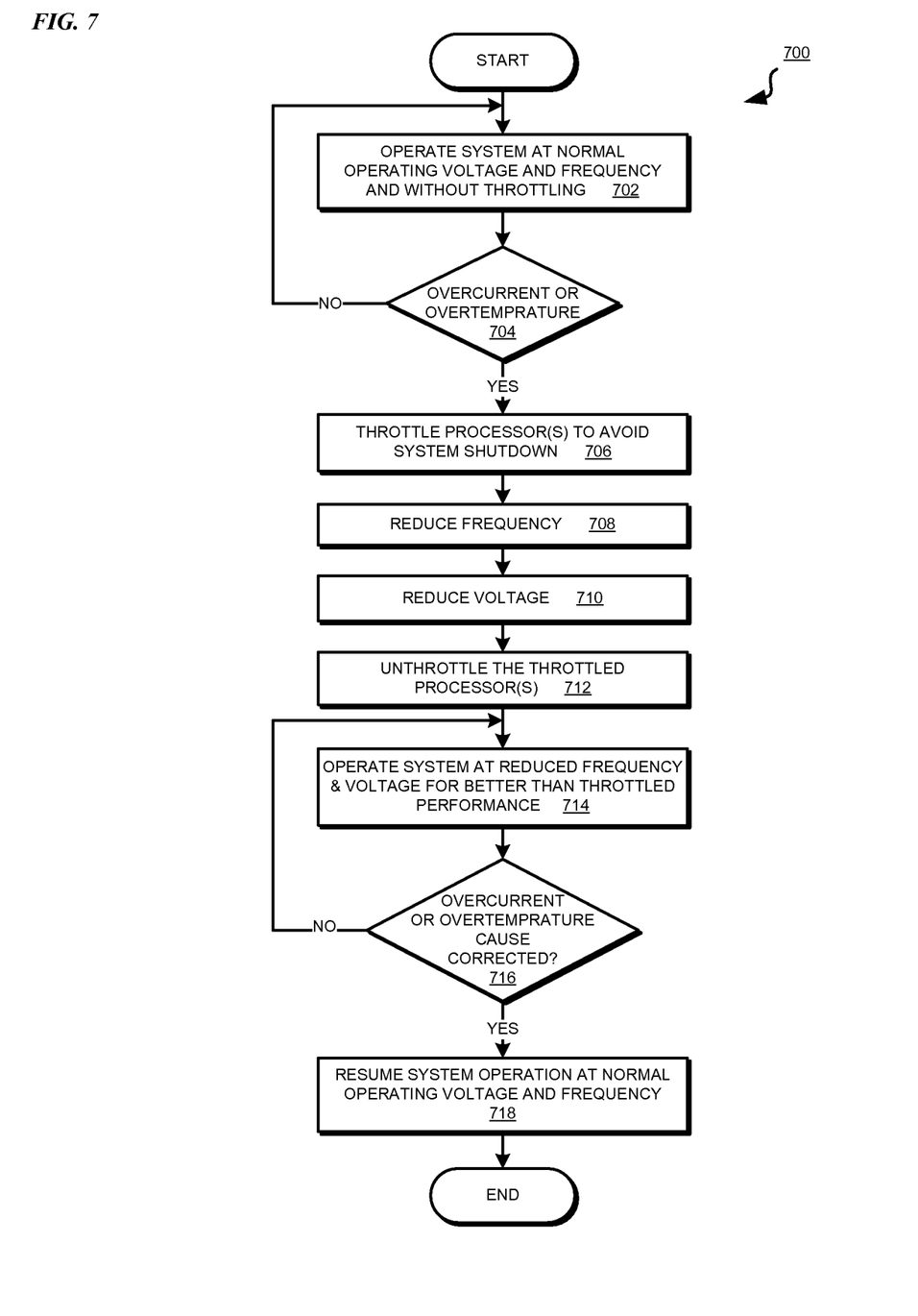
FIG. 7 depicts a flowchart of the process of improving processor performance during power supply failure in accordance with an illustrative embodiment.

With reference to FIG. 7, this figure depicts a flowchart of the process of improving processor performance during power supply failure in accordance with an illustrative embodiment. Process 700 may be implemented as processes 500 and 600 in FIGS. 5 and 6 respectively. Process 700 may be implemented, as an example, using configuration 300 in FIG. 3.

Process 700 begins as a data processing system operates at normal voltage and frequency without processor throttling (step 702). Process 700 determines if an over-current condition or an over-temperature condition exists (step 704). As described above with respect to FIG. 4, an over-current condition can cause processor throttling. Other conditions may also cause a data processing system to throttle the processors. For example, if the processor's temperature exceeds a threshold temperature, the data processing system may throttle the processor in order to allow the processor to cool down.

If process 700 determines that no over-current or over-temperature conditions exist ("No" path of step 704), process 700 returns to step 702. If however, an over-current or over-temperature conditions exists ("Yes" path of step 704), process 700 throttles the one or more processors in the data processing system to avoid a system shutdown (step 706).

Process 700 reduces the frequency of the electrical power being supplied to the processor (step 708). Process 700 may also reduce the voltage of the electrical power being supplied to the processor (step 710). Process 700 un-throttles the throttled processor(s) (step 712). In one example embodiment, steps 708, 710, and 712 may proceed as described with respect to process 500 in FIG. 5.

Process 700 allows the data processing system to operate with un-throttled processor(s) at reduced voltage, frequency, or both (step 714). Operating in the manner of step 714 allows the data processing system to operate at better than throttled performance.

Process 700 determines if the cause of the over-current or over-temperature condition has been corrected (step 716). If the cause has not been corrected, ("No" path of step 716), process 700 returns to step 714. If the cause has been corrected, such as by completing a service action in process 600 in FIG. 6, ("Yes" path of step 716), process 700 resumes system operation at normal voltage and frequency, as in an example implementation of process 600 in FIG. 6, (step 718). Process 700 ends thereafter.

The components in the block diagrams and the steps in the flowcharts described above are described only as examples. The components and the steps have been selected for the clarity of the description and are not limiting on the illustrative embodiments. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the illustrative embodiments.

Thus, a computer implemented method, apparatus, and computer program product are provided in the illustrative embodiments for improving processor performance during power supply failure. Using the illustrative embodiments, users can regain some of the processor performance lost due to processor throttling when a power supply failure occurs.

The illustrative embodiments detect the throttling of the processor, such as in the event of over-current or over-temperature and begin to reduce the frequency, voltage, or both to a reduced level acceptable to the particular implementation. Upon achieving the reduced frequency and/or voltage, the illustrative embodiments un-throttle the processor. The processor resumes un-throttled operation albeit at reduced frequency and/or voltage.

When the condition that triggered the processor throttling is corrected, the illustrative embodiments recover the data processing system operation to un-throttled normal frequency and voltage operation. Thus, the illustrative embodiments reduce or eliminate the need for continued throttled operation from the time of the fault to the time the fault is corrected. Using the illustrative embodiments, a data processing system operates in throttled mode for a comparatively much shorter time—the time from the fault to the time the illustrative embodiments can drop the frequency and voltage and un-throttle the processor.

The invention can take the form of an entirely hardware embodiment, an entirely software embodiment, or an embodiment containing both hardware and software elements. In a preferred embodiment, the invention is implemented in software, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for improving processor performance during power supply failure, the computer implemented method comprising:
   detecting, during the power supply failure, a throttled condition of a processor in a data processing system;
   reducing, during the power supply failure, a voltage of the electrical power being provided to the processor; and
   un-throttling, during the power supply failure, the processor.

2. The computer implemented method of claim 1, further comprising:
   reducing a frequency of electrical power being provided to the processor.

3. The computer implemented method of claim 2, further comprising:
   determining whether a condition that caused the throttling has been corrected; and
   returning, responsive to the condition having been corrected, the frequency to normal frequency and the voltage to normal voltage.

4. The computer implemented method of claim 2, wherein the reducing the frequency operation and reducing the voltage operation are each performed by distinct components communicating over a data network external to the data processing system.

5. The computer implemented method of claim 2, wherein the frequency and the voltage are each reduced to respective levels suitable for the processor, wherein the un-throttling is performed by removing a no-operation instruction from the processor's instruction queue, and wherein reducing the frequency, reducing the voltage, and un-throttling the processor result in an increase in processor performance compared to a level of performance of the throttled processor.

6. The computer implemented method of claim 1, wherein the processor is a plurality of processors, and wherein the detecting, reducing, and un-throttling are applied to a subset of processors from the plurality of processors.

7. The computer implemented method of claim 1, further comprising:
   throttling the processor in response to one of (i) an over-current condition in the data processing system, and (ii) an over-temperature condition in the processor.

8. A computer usable program product comprising a computer usable device including computer usable code for improving processor performance during power supply failure, the computer usable code comprising:
   computer usable code for detecting, during the power supply failure, a throttled condition of a processor in a data processing system;
   computer usable code for reducing, during the power supply failure, a voltage of the electrical power being provided to the processor; and
   computer usable code for un-throttling, during the power supply failure, the processor.

9. The computer usable program product of claim 8, further comprising:
   computer usable code for reducing a frequency of electrical power being provided to the processor.

10. The computer usable program product of claim 9, further comprising:
    computer usable code for determining whether a condition that caused the throttling has been corrected; and
    computer usable code for returning, responsive to the condition having been corrected, the frequency to normal frequency and the voltage to normal voltage.

11. The computer usable program product of claim 9, wherein the computer usable code for reducing the frequency operation and computer usable code for reducing the voltage are each executed by distinct components communicating over a data network external to the data processing system.

12. The computer usable program product of claim 9, wherein the frequency and the voltage are each reduced to respective levels suitable for the processor, wherein the computer usable code for un-throttling removes a no-operation instruction from the processor's instruction queue, and wherein executing the computer usable code for reducing the frequency, the computer usable code for reducing the voltage, and the computer usable code for un-throttling the processor results in an increase in processor performance compared to a level of performance of the throttled processor.

13. The computer usable program product of claim 8, wherein the processor is a plurality of processors, and wherein the detecting, reducing, and un-throttling are applied to a subset of processors from the plurality of processors.

14. The computer usable program product of claim 8, further comprising:
computer usable code for throttling the processor in response to one of (i) an over-current condition in the data processing system, and (ii) an over-temperature condition in the processor.

15. A data processing system for improving processor performance during power supply failure, the data processing system comprising:
a storage device including a storage medium, wherein the storage device stores computer usable program code; and
a processor, wherein the processor executes the computer usable program code, and wherein the computer usable program code comprises:
computer usable code for detecting, during the power supply failure, a throttled condition of a processor in a data processing system;
computer usable code for reducing, during the power supply failure, a voltage of the electrical power being provided to the processor; and
computer usable code for un-throttling, during the power supply failure, the processor.

16. The data processing system of claim 15, further comprising:
computer usable code for reducing a frequency of electrical power being provided to the processor.

17. The data processing system of claim 16, further comprising:
computer usable code for determining whether a condition that caused the throttling has been corrected; and
computer usable code for returning, responsive to the condition having been corrected, the frequency to normal frequency and the voltage to normal voltage.

18. The data processing system of claim 16, wherein the computer usable code for reducing the frequency operation and computer usable code for reducing the voltage are each executed by distinct components communicating over a data network external to the data processing system.

19. The data processing system of claim 16, wherein the frequency and the voltage are each reduced to respective levels suitable for the processor, wherein the computer usable code for un-throttling removes a no-operation instruction from the processor's instruction queue, and wherein executing the computer usable code for reducing the frequency, the computer usable code for reducing the voltage, and the computer usable code for un-throttling the processor results in an increase in processor performance compared to a level of performance of the throttled processor.

20. The data processing system of claim 15, wherein the processor is a plurality of processors, and wherein the detecting, reducing, and un-throttling are applied to a subset of processors from the plurality of processors.

21. The data processing system of claim 15, further comprising:
computer usable code for throttling the processor in response to one of (i) an over-current condition in the data processing system, and (ii) an over-temperature condition in the processor.

22. A system for improving processor performance during power supply failure, the system comprising:
means for detecting, during the power supply failure, a throttled condition of a processor in a data processing system;
means for reducing, during the power supply failure, a voltage of the electrical power being provided to the processor; and
means for un-throttling, during the power supply failure, the processor.

23. The system of claim 22, further comprising:
means for reducing a frequency of electrical power being provided to the processor.

24. The system of claim 23, further comprising:
means for determining whether a condition that caused the throttling has been corrected; and
means for returning, responsive to the condition having been corrected, the frequency to normal frequency and the voltage to normal voltage.

25. The system of claim 23, wherein the means for reducing the frequency operation and the means for reducing the voltage are distinct components communicating over a data network external to the data processing system.

26. The system of claim 23, wherein the frequency and the voltage are each reduced to respective levels suitable for the processor, wherein the means for un-throttling removes a no-operation instruction from the processor's instruction queue, and wherein operating the means for reducing the frequency, the means for reducing the voltage, and the means for un-throttling the processor results in an increase in processor performance compared to a level of performance of the throttled processor.

27. The system of claim 22, wherein the processor is a plurality of processors, and wherein the detecting, reducing, and un-throttling are applied to a subset of processors from the plurality of processors.

28. The system of claim 22, further comprising:
means for throttling the processor in response to one of (i) an over-current condition in the data processing system, and (ii) an over-temperature condition in the processor.

* * * * *